(12) United States Patent
Schwarz et al.

(10) Patent No.: US 8,505,662 B2
(45) Date of Patent: Aug. 13, 2013

(54) FLOOR STRUCTURE FOR A MOTOR VEHICLE

(75) Inventors: Martin Schwarz, Stadecken-Elsheim (DE); Stephan Rosenplänter, Sulzheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 12/830,187

(22) Filed: Jul. 2, 2010

(65) Prior Publication Data

US 2011/0000729 A1    Jan. 6, 2011

(30) Foreign Application Priority Data

Jul. 6, 2009    (DE) .......................... 10 2009 031 779

(51) Int. Cl.
     *B60R 16/04*      (2006.01)

(52) U.S. Cl.
     USPC ........................................................ 180/68.5

(58) Field of Classification Search
     USPC ............... 180/65.1, 68.5, 89.11; 296/187.03, 296/187.05, 187.08, 187.11, 193.07, 193.08, 296/203.04
     See application file for complete search history.

(56) References Cited

U.S. PATENT DOCUMENTS

| | | | |
|---|---|---|---|
| 2,104,771 A * | 1/1938 | Saunders ...................... | 180/68.5 |
| 3,978,938 A * | 9/1976 | Joscher et al. ................ | 180/68.4 |
| 4,058,182 A * | 11/1977 | Huber ........................... | 180/274 |
| 4,098,366 A * | 7/1978 | Reinhard et al. ............. | 180/68.5 |
| 5,074,581 A * | 12/1991 | Matsuoka ................ | 280/124.13 |
| 5,484,667 A * | 1/1996 | Sahli et al. ...................... | 429/100 |
| 5,501,289 A * | 3/1996 | Nishikawa et al. .......... | 180/68.5 |
| 5,510,658 A * | 4/1996 | Nakayama ................... | 307/10.1 |
| 5,534,364 A * | 7/1996 | Watanabe et al. ............... | 429/61 |
| 6,220,380 B1 * | 4/2001 | Mita et al. ..................... | 180/65.1 |
| 6,227,322 B1 * | 5/2001 | Nishikawa ................... | 180/68.5 |
| 6,230,834 B1 * | 5/2001 | Van Hout et al. ............ | 180/68.5 |
| 6,273,208 B1 * | 8/2001 | Sand ............................. | 180/299 |
| 6,431,300 B1 * | 8/2002 | Iwase ........................... | 180/68.5 |
| 6,547,020 B2 * | 4/2003 | Maus et al. .................. | 180/68.5 |
| 6,668,957 B2 * | 12/2003 | King ............................. | 180/68.5 |
| 6,978,855 B2 * | 12/2005 | Kubota et al. ................. | 429/442 |
| 6,986,401 B2 * | 1/2006 | Chernoff et al. ............. | 180/311 |

(Continued)

FOREIGN PATENT DOCUMENTS

| | | |
|---|---|---|
| DE | 10044740 A1 | 3/2002 |
| DE | 10349180 A1 | 6/2005 |

(Continued)

OTHER PUBLICATIONS

British Patent Office, British Search Report for British Application No. 1010990.8, Oct. 18, 2010.

(Continued)

*Primary Examiner* — Katy M Ebner
*Assistant Examiner* — Brodie Follman
(74) *Attorney, Agent, or Firm* — Ingrassia Fisher & Lorenz, P.C.

(57) ABSTRACT

A floor structure of a motor vehicle is provided that includes, but is not limited to a mounting for a starter battery in a cross member adjoining wheel arches for rear wheels. The cross member comprises two stiffening webs and is designed tub-shaped between the stiffening webs. Because of this, the starter battery is reliably protected against a crash.

20 Claims, 4 Drawing Sheets

(56) References Cited

U.S. PATENT DOCUMENTS

| | | | |
|---|---|---|---|
| 7,014,002 B2* | 3/2006 | Mizuta | 180/68.5 |
| 7,017,980 B1* | 3/2006 | Bejin et al. | 296/193.07 |
| 7,025,160 B2 | 4/2006 | Awakawa | 180/68.5 |
| 7,040,432 B2* | 5/2006 | Kawasaki et al. | 180/65.1 |
| 7,040,691 B1* | 5/2006 | Jacobs et al. | 296/193.07 |
| 7,051,825 B2* | 5/2006 | Masui et al. | 180/68.5 |
| 7,070,015 B2* | 7/2006 | Mathews et al. | 180/68.5 |
| 7,118,168 B2* | 10/2006 | Vincenti | 296/203.04 |
| 7,401,669 B2* | 7/2008 | Fujii et al. | 180/65.1 |
| 7,466,102 B2* | 12/2008 | Andersson et al. | 320/112 |
| 7,610,978 B2* | 11/2009 | Takasaki et al. | 180/68.5 |
| 7,614,473 B2* | 11/2009 | Ono et al. | 180/299 |
| 7,631,712 B2* | 12/2009 | Watanabe | 180/68.5 |
| 7,654,351 B2* | 2/2010 | Koike et al. | 180/68.5 |
| 7,654,352 B2* | 2/2010 | Takasaki et al. | 180/68.5 |
| 7,688,582 B2* | 3/2010 | Fukazu et al. | 361/690 |
| 7,690,686 B2* | 4/2010 | Hashimura et al. | 280/782 |
| 7,726,427 B2* | 6/2010 | Picavet | 180/68.5 |
| 7,743,863 B2* | 6/2010 | Shindou | 180/68.5 |
| 2002/0157886 A1* | 10/2002 | Iwase | 180/68.5 |
| 2003/0102686 A1* | 6/2003 | McLeod et al. | 296/37.2 |
| 2004/0035617 A1* | 2/2004 | Chaney | 180/65.1 |
| 2004/0079569 A1* | 4/2004 | Awakawa | 180/68.5 |
| 2004/0149500 A1* | 8/2004 | Chernoff et al. | 180/65.1 |
| 2004/0226765 A1* | 11/2004 | Mathews et al. | 180/68.5 |
| 2005/0263332 A1* | 12/2005 | Chernoff et al. | 180/65.1 |
| 2006/0096794 A1* | 5/2006 | Yoshida | 180/65.1 |
| 2006/0119137 A1* | 6/2006 | Coakley | 296/187.03 |
| 2006/0289224 A1* | 12/2006 | Ono et al. | 180/311 |
| 2007/0007054 A1* | 1/2007 | Nakashima et al. | 180/65.1 |
| 2007/0040418 A1* | 2/2007 | Ohkuma et al. | 297/15 |
| 2007/0107963 A1* | 5/2007 | Chiu | 180/68.5 |
| 2007/0269713 A1* | 11/2007 | Hanson et al. | 429/99 |
| 2008/0190679 A1* | 8/2008 | Sato et al. | 180/68.5 |
| 2008/0196957 A1* | 8/2008 | Koike et al. | 180/68.5 |
| 2008/0283316 A1* | 11/2008 | Ono et al. | 180/68.5 |
| 2009/0026802 A1* | 1/2009 | Imada et al. | 296/187.11 |
| 2009/0044997 A1* | 2/2009 | Picavet | 180/68.5 |
| 2009/0050387 A1* | 2/2009 | Yustick et al. | 180/68.5 |
| 2009/0058142 A1* | 3/2009 | Park | 296/193.07 |
| 2009/0090575 A1* | 4/2009 | Nagasaka | 180/68.5 |
| 2009/0120703 A1* | 5/2009 | Nagata | 180/68.5 |
| 2009/0166116 A1* | 7/2009 | Kiya et al. | 180/68.5 |
| 2009/0186266 A1* | 7/2009 | Nishino et al. | 429/120 |
| 2009/0226806 A1* | 9/2009 | Kiya | 429/186 |
| 2009/0236161 A1* | 9/2009 | Meier et al. | 180/68.5 |
| 2009/0236162 A1* | 9/2009 | Takasaki et al. | 180/68.5 |
| 2009/0242299 A1* | 10/2009 | Takasaki et al. | 180/68.5 |
| 2010/0000816 A1* | 1/2010 | Okada | 180/68.5 |
| 2010/0025127 A1* | 2/2010 | Oyobe | 180/65.22 |
| 2010/0059208 A1* | 3/2010 | Nakamura | 165/104.34 |
| 2010/0071979 A1* | 3/2010 | Heichal et al. | 180/68.5 |
| 2010/0273040 A1* | 10/2010 | Kubota et al. | 429/100 |
| 2010/0307848 A1* | 12/2010 | Hashimoto et al. | 180/68.5 |
| 2011/0000729 A1* | 1/2011 | Schwarz et al. | 180/68.5 |
| 2011/0011654 A1* | 1/2011 | Kubota et al. | 180/65.21 |
| 2011/0024207 A1* | 2/2011 | Higashino et al. | 180/65.1 |
| 2011/0262801 A1* | 10/2011 | Schwab | 429/163 |
| 2012/0055722 A1* | 3/2012 | Matsuzawa et al. | 180/65.21 |

FOREIGN PATENT DOCUMENTS

| | | |
|---|---|---|
| JP | 63161090 U | 10/1988 |
| JP | 4300792 A | 10/1992 |
| JP | 5201355 A | 8/1993 |
| JP | 5201356 A | 8/1993 |
| JP | 6001267 A | 1/1994 |
| JP | 6344955 A | 12/1994 |
| JP | 3045269 B2 | 5/2000 |
| JP | 2004243882 A | 9/2004 |

OTHER PUBLICATIONS

German Patent Office, German Search Report for German Application No. 102009031779.1, May 19, 2010.

* cited by examiner

FLOOR STRUCTURE FOR A MOTOR VEHICLE

CROSS-REFERENCE TO RELATED APPLICATION

This application claims priority to German Patent Application No. 102009031779.1, filed Jul. 6, 2009, which is incorporated herein by reference in its entirety.

TECHNICAL FIELD

The invention relates to a floor structure for a motor vehicle with side members arranged in driving direction laterally delimiting the floor structure, with a floor panel, with stiffening webs mounted on the floor panel arranged transversely to the driving direction and interconnecting the side members and with wheel arches for front and rear wheels.

BACKGROUND

Floor structures are frequently used in modern motor vehicles and are known from practice. Cross members form the stiffening webs with which the floor structure is stiffened. Various components to be arranged in the motor vehicle are usually mounted on rails, brackets or the like fastened to the floor panel. Because of this, the components require a lot of space which particularly in the rear region of the floor structure limits the possibility of arranging a spare wheel or a preferably large volume of a fuel tank. The brackets or rails can additionally limit the arrangement of the cross members, so that ensuring a required stiffness of the floor structure requires major effort. Great stiffness of the floor structure is particularly necessary in the passenger compartment under the seats in order to guarantee crash safety.

Embodiments of the invention are at least based on solving the problem of further developing the floor structure of the type mentioned at the outset so that it preferably provides a lot of space for various components and particularly great stiffness. In addition, other problems may be solved, and desirable features and characteristics will become apparent from the subsequent summary and detailed description, and the appended claims, taken in conjunction with the accompanying drawings and this background.

SUMMARY

According to an embodiment of the invention, this problem is solved in that two stiffening webs adjoining the wheel arches of the rear wheels delimit a mounting for additional components.

Through this configuration a mounting of stiffening webs in the region of the wheel arches is formed. Because of this, additional brackets to be mounted can be avoided. Since the mounting is arranged directly on the stiffening webs the components to be mounted to the floor structure can be mounted in a particularly space-saving manner. Furthermore, the components mounted in the mounting are reliably protected from the stiffening webs, the wheel arches of the rear wheels and the side members in the event of a crash.

If the mounting is arranged above a torsion tube of a rear axle this additionally contributes to the space-saving arrangement of the mounting. If the mounting is arranged below or immediately behind a rear seat of the motor vehicle, this contributes to a further increase of the crash safety of the floor structure. This arrangement of the mounting below or immediately behind the rear seat of the motor vehicle additionally has the advantage that the components arranged in the mounting are protected in a particularly crash-safe manner since the passenger compartment with the rear seats usually has particularly great stiffness.

According to another further embodiment of the invention the mounting can contribute to the stiffening of the floor structure if the mounting is designed tub-shaped, open in its side facing away from the floor panel.

According to another advantageous further development of the invention the mounting can be produced particularly cost-effectively if an individual cross member interconnecting the side members and welded to the floor panel comprises the two stiffening webs. A further advantage of this configuration consists in that the cross member comprising the stiffening webs is stiffened through the tub-shaped mounting. This cross member can thus be formed particularly wide to accommodate the additional components.

The floor structure is particularly simple in design if the stiffening webs are arranged on two cross members interconnecting the side members and welded to the floor panel.

The floor panel could for example form a floor of the mounting. However, this results in that the components inserted in the mountings are arranged very high. According to another embodiment of the invention, components inserted into the mounting can be arranged particularly low if the floor panel has a clearance for the mounting.

According to another embodiment of the invention, components arranged in the mounting can be simply connected with the electrical network of the motor vehicle if the cross member comprising the stiffening webs and the mounting has an opening between the stiffening webs for routing through electrical lines.

It contributes to the further simplification of the assembly of the floor structure according to the invention if a member forms a pre-assembled constructional unit with the starter battery and is glued into the mounting. Preferentially the plastic member in addition to the gluing is positively connected to the mounting for example through screw connection.

The member could be manufactured of steel sheet for example. The floor structure according to an embodiment of the invention however has a particularly low weight if the member is manufactured of plastic, light-metal or a composite material.

According to another embodiment of the invention, great protection of a starter battery can be simply achieved if a starter battery of a combustion engine of the motor vehicle is arranged in the mounting. Because of this, the starter battery is protected from damage and thus leaking in the event of a crash. In addition it can be largely prevented by this that terminals of the starter battery come in contact with metal components of the motor vehicle body. In addition to the starter battery and electronic control devise can additionally be arranged in the mounting.

It contributes to the further simplification of the assembly of the motor vehicle comprising the floor structure if the member closes the opening for routing through electrical lines. Preferentially the plastic member has a permanently elastic seal for closing the opening.

BRIEF DESCRIPTION OF THE DRAWINGS

The present invention will hereinafter be described in conjunction with the following drawing figures, wherein like numerals denote like elements, and FIG. 1. is a schematic view of a motor vehicle with a floor structure according to an embodiment of the invention.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
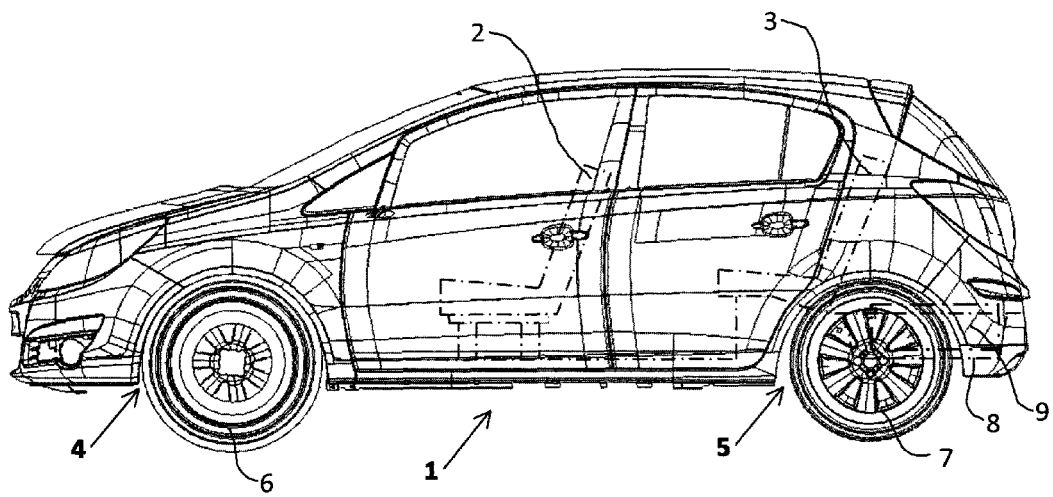

FIG. 1 shows a motor vehicle with a floor structure 1 and with front seats 2 arranged veering in driving direction and with rear seats 3. The floor structure 1 has wheel arches 4,5 for front and rear wheels 6,7 and a trough 8 for a spare wheel 9.

Figure 2:
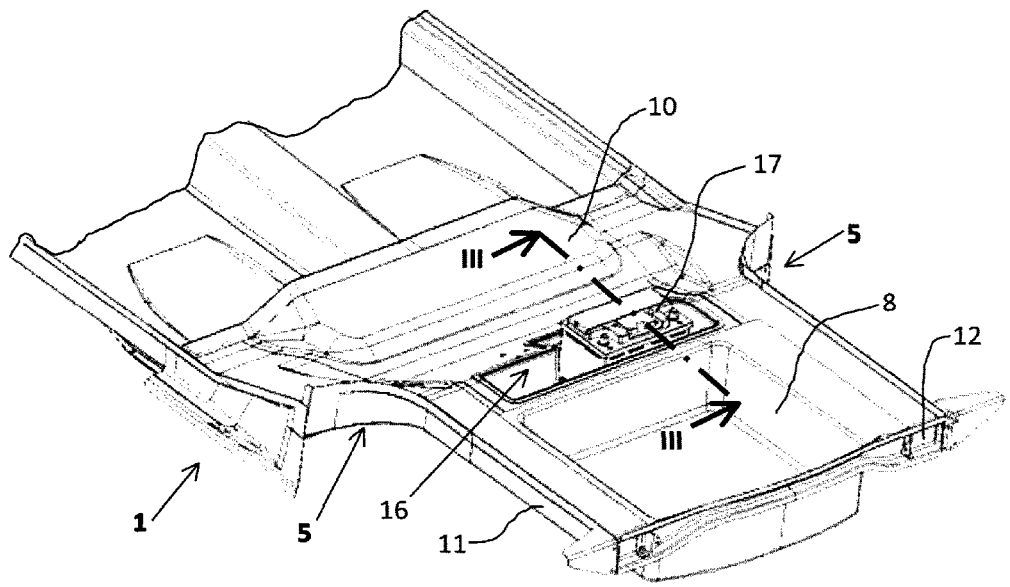
FIG. 2. is a perspective view of the floor structure from FIG. 1 with a starter battery arranged therein.

The floor structure 1 is perspectively shown in FIG. 2. Here it is evident that the floor structure 1 comprises a floor panel 10 and size delimited laterally by side members 11, 12 facing in driving direction. The side members 11,12 are interconnected via a cross member 13 in the region of the rear wheel arches 5 and thus immediately behind the rear seats 3. The cross member 13 is thus located in front of the trough 8 for the spare wheel 9 and comprises two stiffening webs 14,15 interconnecting the side members 11,12. Between the stiffening webs 14,15 a mounting 16 for a starter battery 17 is arranged.

Figure 3:
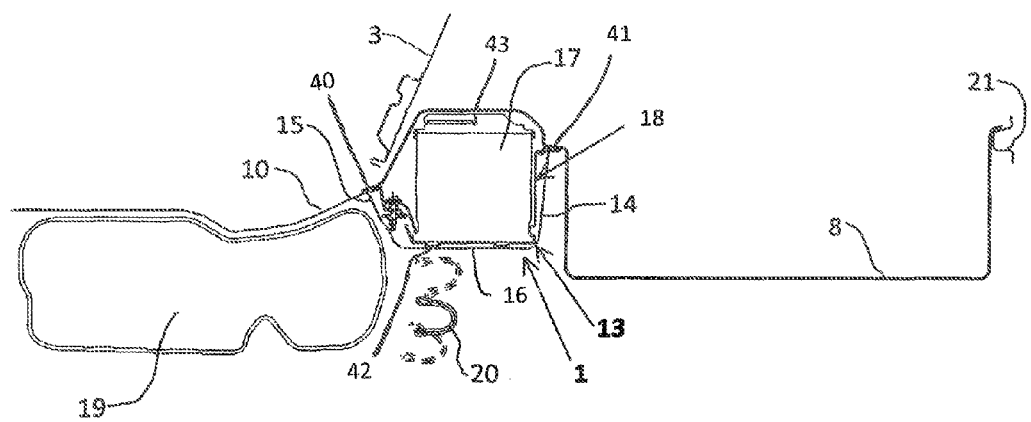
FIG. 3. is an enlarged sectional representation through the floor structure from structure 2 along the line III-III.

FIG. 3 shows in a sectional representation through the floor structure 1 from FIG. 2 along the line III-III that the starter battery 17 is arranged on a member 18 which is glued and additionally screwed into the cross member 13 at mounting position 42, which may represent a weld or screw. The cross member 13 is welded to the floor panel 10 of the floor structure 1 from the bottom at welds 40, 41. In addition, FIG. 3 shows that a fuel tank 19 is arranged in driving direction in front of the cross member 13. In FIG. 3 a torsion tube 20 of a rear axle not shown in more detail is shown at various bump depths. The cross member 13 with the mounting 16 for the starter battery 17 is elevated in such a manner that contact with the torsion tube 20 even with maximum bump is excluded. Seen in driving direction behind the trough 8, a rear cross member 21 is additionally arranged. A cover 43 may be provided, as shown in FIG. 3 and omitted in the other Figs.

Figure 4:
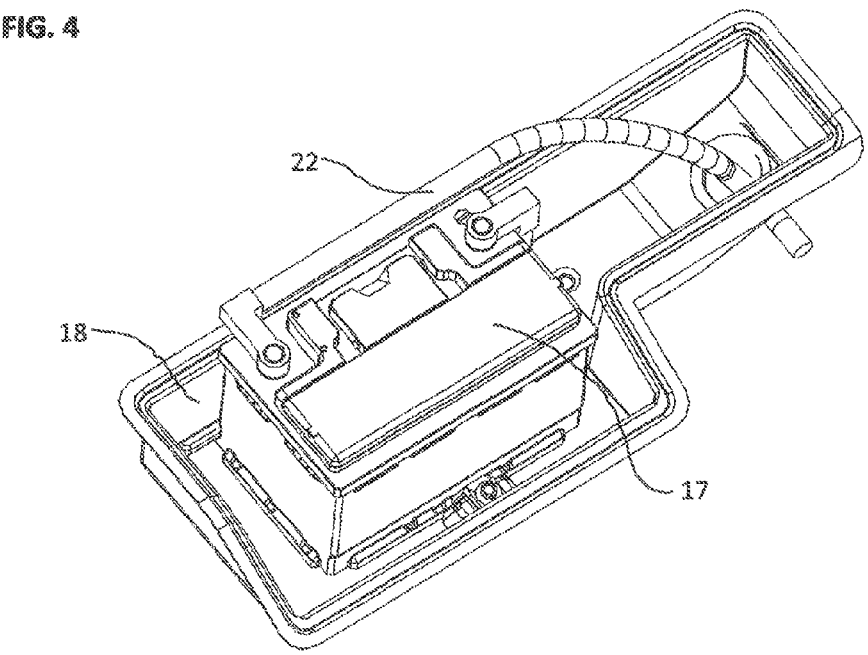
FIG. 4. is a perspective view a member with a starter battery from FIG. 2.

FIG. 4 perspectively shows the member 18 with the starter battery 17 from FIG. 2 and FIG. 3. Here it can be seen that the member 18 is designed tub-shaped. An electrical line 22 for the plus terminal of the starter battery 17 is routed downwards and away through the member 18.

Figure 5:
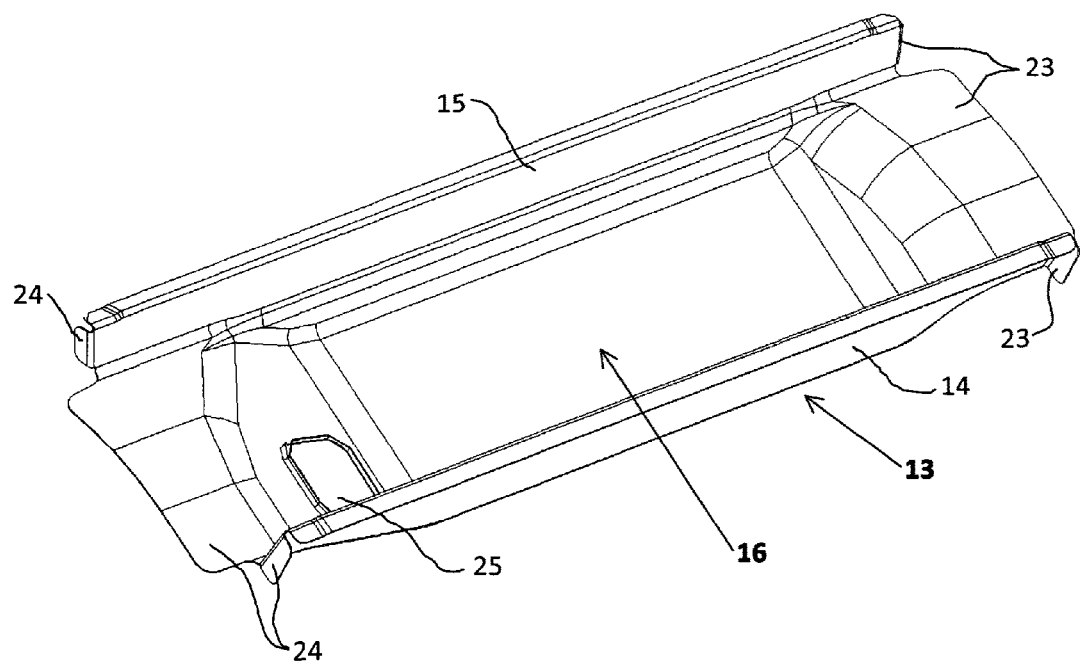
FIG. 5. is a view of a cross member with a mounting arranged between two stiffening webs for the member from FIG. 5.

FIG. 5 shows the cross member 13 with the mounting 16 for the starter battery 17 before the assembly to the floor structure 1. Here it can be seen that the stiffening webs 14,15 are arranged vertically and have flanges 23,24 for connecting to the floor panel 10 shown in FIG. 3. Between the stiffening webs 14,15 the mounting 16 is arranged. The mounting 16 additionally has an opening 25 for the electrical line 22 of the starter battery 17. The opening 25 is closed by the member 18 shown in FIG. 4.

Figure 6:
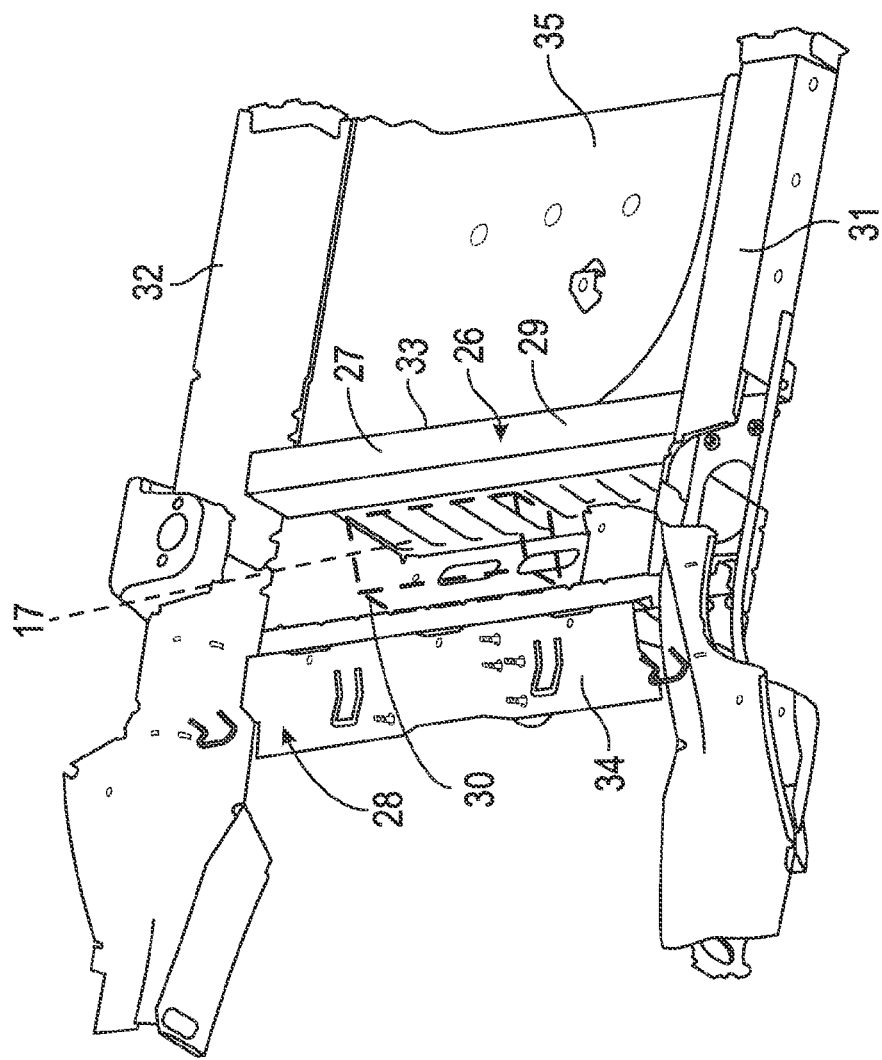
FIG. 6. is a view of a part region of a further embodiment of the floor structure of the motor vehicle.

FIG. 6 shows a further embodiment of the floor structure 1, wherein a mounting 26 for the starter battery 17 (schematically shown) is arranged between two separate cross members 27, 28. The cross members 27, 28 each have stiffening webs 29,30 adjoining the mounting and interconnect two side members 31,32. Horizontal webs 33, 34 of the cross members 27, 28 form a pedestal elevated with respect to a floor panel 35.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A floor structure for a motor vehicle, comprising:
a floor panel;
side members arranged in a driving direction and laterally delimiting the floor panel, wherein the side members form wheel arches for at least one of front wheels or rear wheels;
at least two stiffening webs arranged vertically and transversely to the driving direction and interconnecting the side members, the at least two stiffening webs being mounted on the floor panel and extending between the wheel arches, the at least two stiffening webs including a first stiffening web and a second stiffening web; and
a mounting extending between the at least two stiffening webs and configured to receive a component
a first flange extending from the first stiffening web and welded to the floor panel; and
a second flange extending from the second stiffening web and welded to the floor panel.

2. The floor structure according to claim 1, wherein the mounting is arranged above a torsion tube of a rear axle.

3. The floor structure according to claim 1, wherein the mounting is arranged behind a rear seat of the motor vehicle.

4. The floor structure according to claim 1, further comprising a tubshaped member mounted on the mounting, the tubshaped member being open in a side facing away from the floor panel.

5. The floor structure according to claim 1, further comprising a cross member interconnecting the side members and welded to the floor panel, the at least two stiffening webs being arranged on the cross member.

6. The floor structure according to claim 1, further comprising two cross members interconnecting the side members and welded to the floor panel, the at least two stiffening webs being arranged on the two cross members.

7. The floor structure according to claim 1, wherein the floor panel has a clearance for the mounting.

8. The floor structure according to claim 5, wherein the cross member comprises an opening between the at least two stiffening webs adapted to accommodate electrical lines passing therethrough.

9. The floor structure according to claim 5, wherein the cross member, the mounting, and the at least two stiffening webs are adapted to form a pre-assembled constructional unit.

10. The floor structure according to claim 9, wherein the cross member is manufactured of a plastic.

11. The floor structure according to claim 9, wherein the cross member is manufactured of a light-metal material.

12. The floor structure according to claim 9, wherein the cross member is manufactured of a composite material.

13. The floor structure according to claim 8, further comprising a starter battery of a combustion engine of the motor vehicle arranged in the mounting.

14. The floor structure according to claim 8, further comprising a seal configured to close the opening.

15. The floor structure according to claim 1, wherein the mounting is arranged below a rear seat of the motor vehicle.

16. The floor structure according to claim 5, wherein the cross member is a single cross member.

17. The floor structure according to claim 13, further comprising a trough between the side members and completely behind the stiffening webs relative to the driving direction of the motor vehicle, the trough configured to hold a spare tire.

18. The floor structure according to claim 17, further comprising a gas tank laterally between the side members and completely in front of the stiffening webs relative to the driving direction of the motor vehicle.

19. A floor structure for a vehicle, comprising:
a floor panel;
side members arranged in a driving direction and laterally delimiting the floor panel;
a cross member extending between the side members, the cross member comprising
    a first vertical stiffening web extending between and mounted to the side members,
    a second vertical stiffening web extending between and mounted to the side members,
    a first flange extending from the first vertical stiffening web and welded to the floor panel;
    a second flange extending from the second vertical stiffening web and welded to the floor panel; and
    a generally horizontal mounting surface extending between the first vertical stiffening web and the second vertical stiffening web;
a tubshaped member configured to receive a starter battery, the tubshaped member affixed to a mounting surface of the cross-member.

20. The floor structure of claim 1, wherein the first flange is generally perpendicular to the first stiffening web and includes at least a first portion generally parallel to the floor panel, and wherein the second flange is generally perpendicular to the second stiffening web and includes at least a second portion generally parallel to the floor panel.

* * * * *